(12) United States Patent
Lee et al.

(10) Patent No.: US 12,456,039 B2
(45) Date of Patent: Oct. 28, 2025

(54) ARTIFICIAL NEURAL NETWORK COMPUTATION ACCELERATION APPARATUS FOR DISTRIBUTED PROCESSING, ARTIFICIAL NEURAL NETWORK ACCELERATION SYSTEM USING SAME, AND ARTIFICIAL NEURAL NETWORK ACCELERATION METHOD THEREFOR

(71) Applicant: DEEPER-I CO., INC., Seoul (KR)

(72) Inventors: Sang Hun Lee, Yongin-si (KR); Bong Jeong Kim, Seongnam-si (KR); Joo Hyuk Kim, Seoul (KR)

(73) Assignee: DEEPER-I CO., INC., Seoul (KR)

( * ) Notice: Subject to any disclaimer, the term of this patent is extended or adjusted under 35 U.S.C. 154(b) by 1248 days.

(21) Appl. No.: 17/281,456

(22) PCT Filed: Jul. 18, 2019

(86) PCT No.: PCT/KR2019/008905
§ 371 (c)(1),
(2) Date: Mar. 30, 2021

(87) PCT Pub. No.: WO2020/075957
PCT Pub. Date: Apr. 16, 2020

(65) Prior Publication Data
US 2022/0004854 A1    Jan. 6, 2022

(30) Foreign Application Priority Data

Oct. 8, 2018  (KR) .................. 10-2018-0119856
Oct. 8, 2018  (KR) .................. 10-2019-0007723

(51) Int. Cl.
*G06N 3/063*   (2023.01)
*G06N 3/045*   (2023.01)
(Continued)

(52) U.S. Cl.
CPC ............. *G06N 3/063* (2013.01); *G06N 3/045* (2023.01); *G06N 3/08* (2013.01)

(58) Field of Classification Search
CPC ............................. G06N 3/063; G06F 13/385
See application file for complete search history.

(56) References Cited

U.S. PATENT DOCUMENTS 6,654,730 B1     11/2003  Kato et al.
2004/0027990 A1*  2/2004  Lee .................. G06F 13/385
                                              370/411
(Continued)

FOREIGN PATENT DOCUMENTS

CN     106991476 A      7/2017
CN     107316078 A     11/2017
(Continued)

OTHER PUBLICATIONS

Joet al., "DSIP: A scalable inference accelerator for Convolutional neural networks", IEEE Journal of Solid-State Circuits, Feb. 2018, pp. 1-14, vol. 53, No. 2.
(Continued)

*Primary Examiner* — Getente A Yimer
(74) *Attorney, Agent, or Firm* — NKL Law; Jae Youn Kim

(57) ABSTRACT

An artificial neural network computation acceleration apparatus for distributed processing includes an external main memory for storing input data and synapse weights for input neurons; an internal buffer memory for storing a synapse weight and input data required for each cycle constituting the artificial neural network computation; a DMA module for directly transmitting/receiving data to/from the external main memory and the internal buffer memory; and a general-use communication media block capable of transmitting/receiving the input data and the synapse weights for the input neurons and a result of the computation performed by (Continued)

[INPUT LAYER]   [HIDDEN LAYER-1]   [HIDDEN LAYER-2]   [OUTPUT LAYER]

the neural network computation device to/from another acceleration apparatus physically connected regardless of the type of an integrated circuit.

9 Claims, 11 Drawing Sheets

(51) Int. Cl.
*G06N 3/08* (2023.01)
*G11C 16/08* (2006.01)
*G11C 16/26* (2006.01)

(56) References Cited

U.S. PATENT DOCUMENTS

| | | | | |
|---|---|---|---|---|
| 2006/0054970 | A1* | 3/2006 | Yanagida | H10D 30/0297 257/E29.066 |
| 2018/0046905 | A1 | 2/2018 | Li et al. | |
| 2018/0046913 | A1 | 2/2018 | Yu et al. | |
| 2018/0121796 | A1 | 5/2018 | Deisher et al. | |
| 2018/0204118 | A1* | 7/2018 | Ono | G06N 3/063 |
| 2018/0341495 | A1* | 11/2018 | Culurciello | G06N 3/063 |
| 2020/0111003 | A1* | 4/2020 | Ross | G06N 3/045 |
| 2024/0007827 | A1* | 1/2024 | Arvanitakis | G06N 3/045 |

FOREIGN PATENT DOCUMENTS

| | | |
|---|---|---|
| CN | 107451659 A | 12/2017 |
| CN | 107657316 A | 2/2018 |
| KR | 10-2017-0096105 A | 8/2017 |
| WO | 2015016640 A1 | 2/2015 |

OTHER PUBLICATIONS

Sharif et al., "Parallel Computing for Artificial Neural Network Training using Java Native Socket Programming", Periodicals of Engineering and Natural Sciences, Feb. 2018, pp. 1-10, vol. 6. No. 1.

* cited by examiner

ARTIFICIAL NEURAL NETWORK COMPUTATION ACCELERATION APPARATUS FOR DISTRIBUTED PROCESSING, ARTIFICIAL NEURAL NETWORK ACCELERATION SYSTEM USING SAME, AND ARTIFICIAL NEURAL NETWORK ACCELERATION METHOD THEREFOR

TECHNICAL FIELD

The present disclosure relates to an artificial neural network acceleration apparatus for distributed processing, an artificial neural network acceleration system using the same, and an artificial neural network acceleration method therefor, and more particularly, to an artificial neural network computation acceleration apparatus, an acceleration system, and an acceleration method therefor, the apparatus which performs distributed processing by distributing, regardless of the type of integrated circuit, data and synapse weights for input neurons required for computation of an artificial neural network into a plurality of artificial neural network computation acceleration apparatuses each having a general-use communication media block that enables communication mediation, and therefore, it is possible to satisfy performance required for an artificial neural network computation even without use of high-power and high-cost hardware, such as GPGPU, but also to flexibly design the artificial neural network according to target performance.

BACKGROUND ART

With the recent development of artificial intelligence technologies, the artificial intelligence technologies have been introduced into various industrial fields.

The deep learning technology, which has evolved into an artificial neural network technology composed of neuron networks based on the Perceptron algorithm that receives multiple signals as inputs and outputs one signal, plays an important role in the artificial intelligence technologies.

Here, in order to perform an artificial neural network technology such as the deep learning technology, a number of weights and calculations for input neurons are required, and thus, an acceleration neural network-related acceleration technology according to a related art has a problem that it is difficult to meet the required computational performance without using expensive hardware such as general-use computing on Graphics Processing Unit (GPGPU), which can perform general-use tasks other than graphics tasks.

In addition, since high power is required to operate the GPGPU, it is difficult to apply the related part to fields that require low power such as Internet of Things (IoT), and, in the case of a data center where large-scale computer systems are installed to process big data with the deep learning technology, an acceleration apparatus required to implement the artificial neural network technology is composed of the GPGPU and requires large-scale power, so there is a serious problem that not only the initial construction cost but also the maintenance cost increases exponentially.

Therefore, in the case of implementing artificial neural network-related acceleration technology, there is an urgent need for a realistic and applicable technology that can satisfy computational performance without requiring expensive hardware such as GPGPU and further reduce power consumption.

DISCLOSURE

Technical Problem

In the view of the above, the present disclosure provides an artificial neural network computation acceleration apparatus, an acceleration system, and an acceleration method therefor, the apparatus which performs distributed processing by distributing, regardless of the type of integrated circuit, data and synapse weights for input neurons required for computation of an artificial neural network into a plurality of artificial neural network computation acceleration apparatuses each having a general-use communication media block that enables communication mediation, and therefore, it is possible to satisfy performance required for an artificial neural network computation even without use of high-power and high-cost hardware, such as GPGPU, but also to flexibly design the artificial neural network according to target performance.

Technical Solution

An artificial neural network computation acceleration apparatus for distributed processing to process a computation of an artificial neural network in which input neurons are hierarchically configured, according to an embodiment of the present disclosure includes: an external main memory configured to store input data and synaptic weights for the input neurons; an internal buffer memory configured to store a synaptic weight and input data required for each cycle constituting the artificial neural network computation among synaptic weights and input data stored in the external main memory; a DMA module configured to directly transmit and receive data to and from the external main memory and the internal buffer memory; a neural network computation device configured to repeatedly process, for each cycle constituting the artificial neural network computation, a series of sequential steps of reading the synapse weight and the input data stored in the internal buffer memory so as to perform an artificial neural network computation and store a computation result in the external main memory; a CPU configured to control an operation of storing the input data and the synapse weights for the input neurons in the external main memory and the internal buffer memory, and an operation of the neural network computation device; and a general-use communication media block configured to transmit/receive the input data and the synapse weights for the input neurons and a result of the computation performed by the neural network computation device to/from another acceleration apparatus physically connected regardless of a type of an integrated circuit.

An artificial neural network acceleration system for processing a computation of an artificial neural network in which input data for input neurons has a plurality of depths according to an embodiment of the present disclosure includes: a host acceleration apparatus connected to a flash memory in which entire synaptic weights required for the artificial neural network computation is stored, and having a host communication media block in a number greater than or equal to a number of the plurality of depths; and a plurality of slave acceleration apparatuses each having at least one slave communication media block physically connected to the host communication media block of the host acceleration apparatus, the slave acceleration apparatus which are formed to respectively correspond to the plurality of depths, and the host acceleration apparatus may cause an artificial neural network computation to be processed by distributing synaptic weights and input data to slave accelerators related respectively to of the plurality of depths in a parallel manner, and performs a final computation by aggregating intermediate computation results of the slave acceleration apparatuses.

An artificial neural network acceleration system for processing a computation of an artificial neural network in which input neurons are configured with a plurality of layers according to an embodiment of the present disclosure includes: a host acceleration apparatus connected to a flash memory in which entire synaptic weights required for the artificial neural network computation is stored, and having at least one pair of host communication media blocks for transmission and reception; and a plurality of slave acceleration apparatuses having at least one pair for slave communication media blocks for transmission and reception in order to be sequentially connected to the host acceleration apparatus in the form of a pipeline as a whole, and synapse weights and input data for the input neurons constituting the artificial neural network computation may be sequentially distributed into the host acceleration apparatus and the slave acceleration apparatuses to process an artificial neural network computation.

An artificial neural network acceleration system for processing a computation of an artificial neural network in which input data for input neurons are configured with a plurality of (M) depths and a plurality of (N) layers, according to an embodiment of the present disclosure includes: a host acceleration apparatus connected to a flash memory in which entire synaptic weights required for the artificial neural network computation is stored, and having a host communication media block in a number greater than or equal to a number of the plurality (N) layers; and a plurality of slave acceleration apparatuses each having at least one slave communication media block physically connected to the host communication media block of the host acceleration apparatus or to another acceleration apparatus, the slave acceleration apparatuses which are formed to respectively correspond to a number of (M×N) cycles required for the plurality of (M) depths and the plurality of (N) layers.

An artificial neural network acceleration method for accelerating processing of an artificial neural network having a hierarchical structure including an input layer and N hidden layers by using an artificial neural network computation acceleration apparatus for distributed processing, the apparatus which is composed of a single integrated circuit according to an embodiment of the present disclosure, the apparatus which is composed of a single integrated circuit, includes: operation a1 of, in response to power being applied to the acceleration apparatus, storing entire synaptic weights of input neurons for an artificial neural network computation, which are stored in an external flash memory, in an external main memory; operation a2 of storing initial input data, which is input through a data input device, in an external main memory through a DMA module; operation a3 of storing the input data stored in the external main memory and the synaptic weights corresponding to the input data in an internal buffer memory as much as needed for each cycle constituting the input layer of the artificial neural network; operation a4 of reading, by a neural network computation device, the synaptic weight and the input data, stored in the internal buffer memory to correspond to each cycle constituting the artificial neural network so as to perform an artificial neural network computation until completion of the computation for the entire layers, and storing a result of the computation in an external memory so as to use the result as input data for a next layer; and operation a5 of repeatedly performing, on the N hidden layers, a process of performing the operation a4 after the synapse weights and the input data for the input neurons required for an artificial neural network computation for a hidden layer are read as much as needed for each cycle from the external main memory and then stored in the internal buffer memory.

Regarding a method for accelerating an artificial neural network in which input data for input neurons has a plurality of depths according to an embodiment of the present disclosure, it is possible to perform distributed processing of the input data and synapse weights for the input neurons to acceleration apparatuses respectively corresponding to the plurality of depths.

Regarding a method for accelerating an artificial neural network in which input neurons are configured in a structure having a plurality of layers according to an embodiment of the present disclosure, it is possible to provide a method for distributed processing of input data and synapse weights for input neurons to acceleration apparatuses respectively corresponding to the plurality of layers.

Regarding a method for accelerating an artificial neural network in which input data for input neurons are formed in a structure having a plurality of depths and a plurality of layers according to an embodiment of the present disclosure, it is possible to provide a method for distributed processing of input data and synapse weights for the input neurons to acceleration apparatuses respectively corresponding to a plurality of depths respectively constituting a plurality of layers.

Advantageous Effects

As described above, the present disclosure has an effect of providing an artificial neural network computation acceleration apparatus, an acceleration system, and an acceleration method therefor, the apparatus which performs distributed processing by distributing, regardless of the type of integrated circuit, data and synapse weights for input neurons required for computation of an artificial neural network into a plurality of artificial neural network computation acceleration apparatuses each having a general-use communication media block that enables communication mediation, and therefore, it is possible to satisfy performance required for an artificial neural network computation even without use of high-power and high-cost hardware, such as GPGPU, but also to flexibly design the artificial neural network according to target performance.

MODE FOR DISCLOSURE

Hereinafter, embodiments of the present disclosure will be described with reference to the accompanying drawings.

Figure 1:
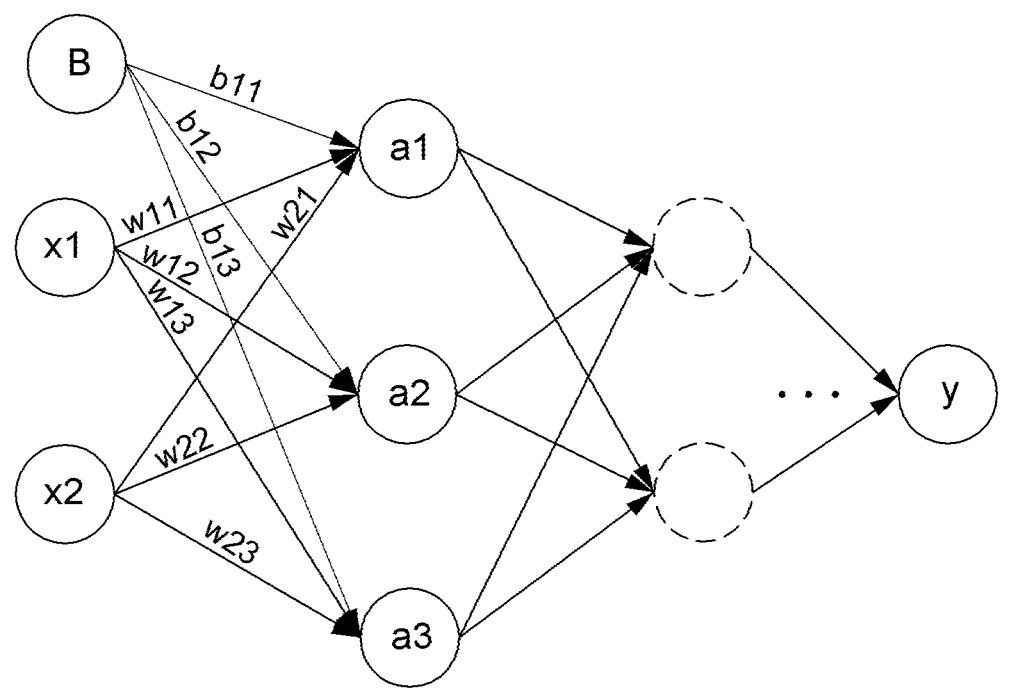
FIG. 1 is a conceptual diagram schematically illustrating a neural network including an input layer and a hidden layer to which an embodiment of the present disclosure is applied.

FIG. 1 is a conceptual diagram schematically illustrating a neural network model including an input layer, a hidden layer, and an output layer to which an embodiment of the present disclosure is applied.

As shown in the drawing, the artificial neural network model of FIG. 1 has a hierarchical structure including an input layer, a plurality of hidden layers, and an output layer.

Here, a circle of each layer is called a neuron, and an arrow connected from each neuron to another neuron of the next layer is called a synapse indicating the connection between the neurons.

For example, x1 represents one of the neurons in the input layer, and a1 represents one of the neurons in the hidden layer-1.

Meanwhile, in order to mathematically express the neural network model of FIG. 1, the neural network model may be expressed as the following [Equation 1] where A is a computation result, W is a weight, X is an input, and B is a bias.

$$A = |a1 \ a2 \ a3|, X = |x1 \ x2|, \quad \text{[Equation 1]}$$
$$B = |b11 \ b12 \ b13|$$
$$W = \begin{vmatrix} w11 & w12 & w13 \\ w21 & w22 & w23 \end{vmatrix}$$

In addition, if [Equation 1] is simplified and expressed as an equation using an inner product of a matrix, it can be expressed as [Equation 2] below.

$$A = XW + B \quad \text{[Equation 2]}$$

Figure 2:
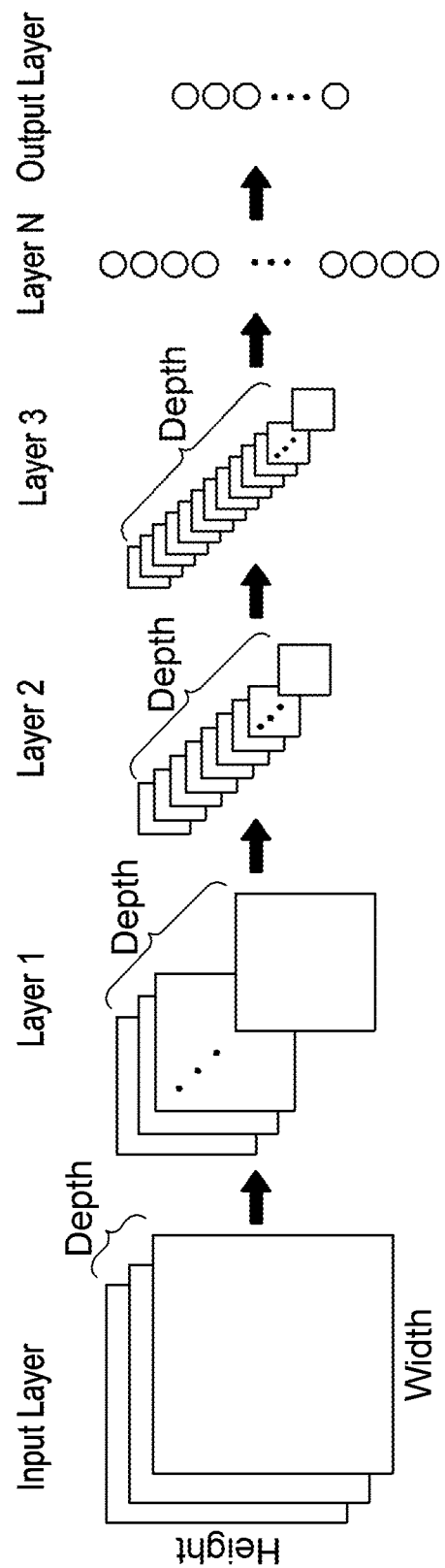
FIG. 2 is a diagram schematically illustrating a deep neural network into which the artificial neural network shown in FIG. 1 is extended.

FIG. 2 is a diagram schematically illustrating a deep neural network into which the artificial neural network shown in FIG. 1 is extended.

As shown in FIG. 2, an artificial neural network having two or more hidden layers is referred to as a deep neural network.

An artificial neural network applied to an embodiment of the present disclosure is configured as a deep neural network mainly applied to imaging, and in general, data on the input neurons may be simplified and expressed as a feature map corresponding to a multidimensional (N-Tensor) in the form of a vector that utilizes the features of an image.

That is, as shown in the drawing, in the embodiment of the present disclosure, a feature map of each layer may be expressed as a dimension consisting of width, height, and depth, and in this case, depth indicates the extended version of a dimension formed by width and height, and in the present specification, the term "depth" may be used to numerically express the extended dimension.

More specifically, "depth" is used when dealing with dimensional expansion in a convolutional neural network (ConvNet) to which an embodiment of the present disclosure is applied, and in a general neural network, for example, when the shape of an image is general RGB (Red, Green, Blue), the shape may be expressed as 224×224×3 (width, height, and color channel), which respectively correspond to width, height, and depth in the convolution neural network, where depth may be replaced with the term "channel."

That is, when an input is an image, each layer in the convolutional neural network according to an embodiment of the present disclosure may have three dimensions of width, height, and depth, and the depth may indicate not the depth of the whole neural network, but the third dimension in the activation volume corresponding to data on input neurons.

In addition, an arrow between respective layers shown in FIG. 2 indicates simplification of transmitting a computation result of each layer as an input of a next adjacent layer.

Here, Layer N represents fully connected layers, and an output in response to an input reconstructing the dimension of a previous layer into one dimension may be expressed as a dimension of [input, output], and an output from the output layer may be used as a final computation result.

Figure 3:
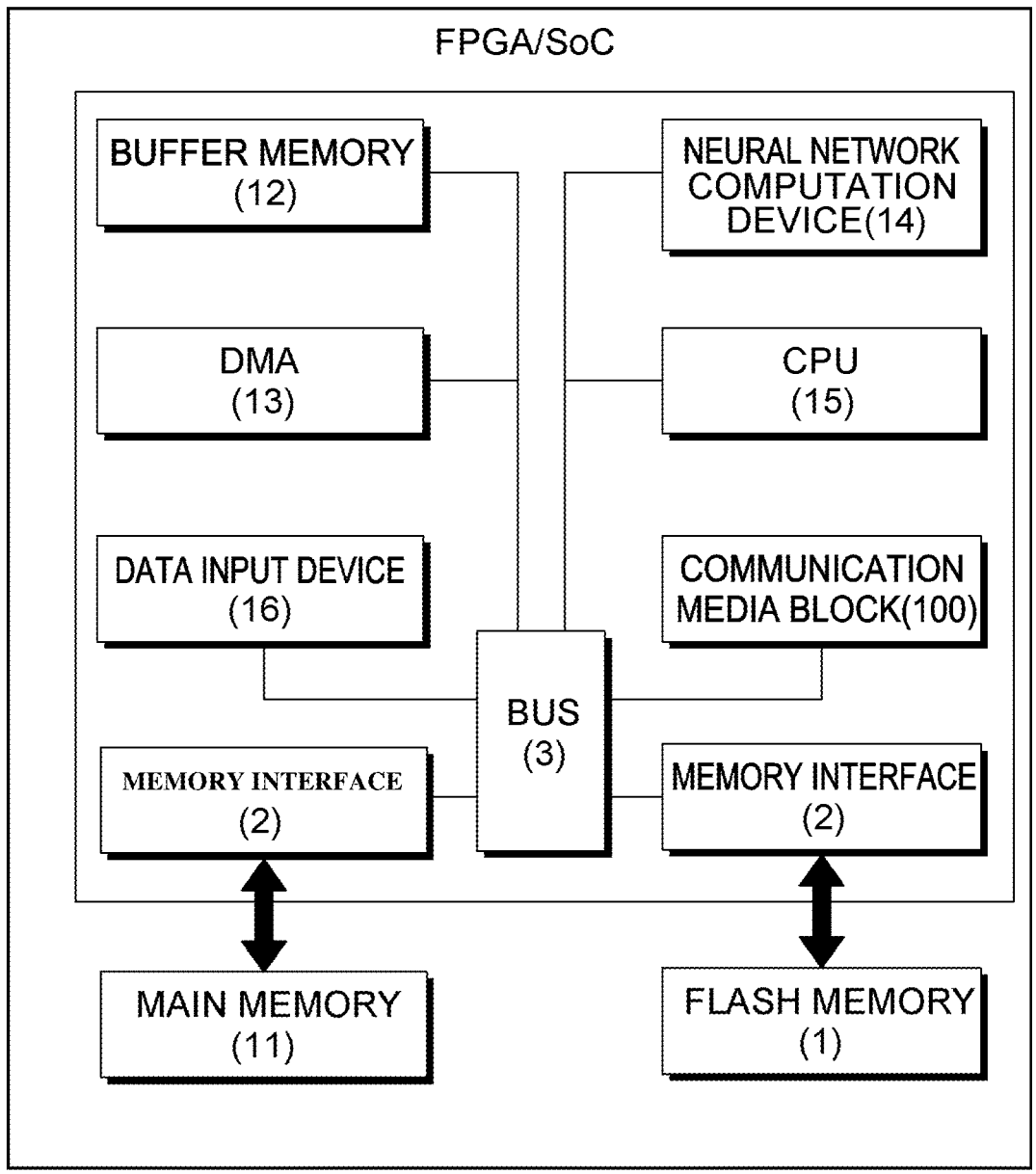
FIG. 3 is a representative diagram, which is a block diagram schematically illustrating the configuration of an integrated circuit of an artificial neural network computation acceleration apparatus for distributed processing according to an embodiment of the present disclosure.

FIG. 3 is a block diagram schematically illustrating the configuration of an integrated circuit of an artificial neural network computation acceleration apparatus for distributed processing according to an embodiment of the present disclosure.

The acceleration apparatus of FIG. 3 is an apparatus for implementing distributed processing of an artificial neural network, which is the core idea of the present disclosure, the apparatus which is capable of processing a computation on input data and synapse weights of an artificial neural network composed of input neurons in layers, and which is provided with a general-use communication media block 100 described later for connection, regardless of the type of an integrated circuit, so that various integrated circuits of a FPGA type or an SoC type can be connected, which enables flexible design according to required performance.

An artificial neural network computation acceleration apparatus for distributed processing according to an embodiment of the present disclosure will be described in detail with reference to the drawings.

As shown in the drawing, the artificial neural network computation acceleration apparatus 10 for distributed processing according to an embodiment of the present disclosure may include a flash memory 1, an external main memory 11, an internal buffer memory 12, and a DMA module 13, a neural network computation device 14, a CPU 15, a data input device 16, and a communication media block 100.

More specifically, the flash memory 1 is configured as a nonvolatile memory such as a Secure Digital (SD) card, and stores all synaptic weights required for a computation of the artificial neural network according to an embodiment of the present disclosure, so that when power is applied to the acceleration apparatus, the synaptic weights are transmitted to the external main memory 11 through the DMA module 13 in accordance with an operation control signal from the CPU.

In addition, the external main memory 11 is a general-use storage means capable of storing input data and synaptic weights for the input neurons under the management of an operating system in order to perform a computation of the artificial neural network according to an embodiment of the present disclosure, and the external main memory 11 may be configured as a volatile memory such as a SDRAM (Dual Data Rate SDRAM) and may be used only when power is applied to the acceleration apparatus, and the term "external memory" used in the present specification may refer to the external main memory 11.

Meanwhile, as shown in the drawing, a memory interface 2 having a control logic for writing or reading data in or from the flash memory 1 and the external main memory 11.

In addition, the internal buffer memory 12 is used as a means, like a buffer, for temporarily storing synaptic weights and input data necessary for each cycle constituting an artificial neural network computation among the synaptic weights and input data stored in the external main memory 11, and may store all or part of the input data and synaptic weights stored in the external main memory 11 according to a configured storage capacity.

In addition, the DMA module 13 is configured to directly transmit and receive data to and from the external main memory 11 and the internal buffer memory 12, and may support a Direct Memory Access (DMA) function by which peripheral devices can directly access the memory to perform a write or read function.

Here, specifically, the DMA module 13 applied to the embodiment of the present disclosure may be used as an alternative to read/write data, so that a central processing unit such as the CPU 15 can avoid waiting without performing other operations until peripheral devices with relative slow processing speed completes reading/writing data, thereby improving the smooth use of hardware computation resources.

In particular, in the embodiment of the present disclosure, the DMA module may be configured to:

1) store weights, stored in an external flash memory 1, in the external main memory 11;

2) store weights and input data, stored in the external main memory 11, in the internal buffer memory 12;

3) transmit a computation result, stored in the external main memory 11, to another acceleration apparatus through an interface of a peripheral device such as a general-use communication media block 100 described later on;

4) store a computation result of the neural network computation device 14 described later in the external main memory 11;

5) store input data from peripheral devices such as the data input device 16 described later in the external main memory 11; and 6) transmit a computation result, stored in the external main memory 11 of the acceleration apparatus based on the general-use communication medium block 100 described later on, to an external main memory 11 of another acceleration apparatus and store the computation result therein, as described above.

In addition, the neural network computation device 14 may repeatedly processing, for each cycle constituting the artificial neural network computation, a series of sequential steps of reading the synapse weight and the input data stored in the internal buffer memory 12 so as to perform an artificial neural network computation and storing the computation result in the external main memory 11.

In addition, the CPU 15 may operate as a central processing device of the acceleration apparatus, including an operation of storing input data and synapse weights for input neurons in the external main memory 11 and the internal buffer memory 12 and an operation of the neural network computation device 14.

In addition, the data input device 16 is a data input means configured as a sensor interface or a peripheral, and in a case where input data is an image as in the embodiment of the present disclosure, the data input means 16 may serve to receive image data from a camera by using an (image) sensor interface to and store the received image data in the external main memory 11.

In addition, the general-use communication media block 100 may transmit and receive the input data and the synapse weights for the input neurons and a result of the computation performed by the neural network computation device 14 to/from another acceleration apparatus physically connected regardless of the type of an integrated circuit.

In this case, the general-use communication media block 100 may serve to transmit and receive addresses, data, and control signals to and from another acceleration apparatus, and may be configured to enable communication mediation when the type of the integrated circuit of the physically connected acceleration apparatus is a System on both Chip (SiC) type or a Field Programmable Gate Array (FPGA) type.

Meanwhile, according to an embodiment of the present disclosure, a bus protocol for communication between respective elements on the integrated circuit of the acceleration apparatus is preferably an Advanced Extensible Interface (AXI) or Advanced High Performance Bus (AHB), which is the industrial standard, and accordingly, the general-use communication media block 100 may serve to receive an AXI or AHB signal and convert the signal into a communication input/output interface signal between acceleration apparatuses.

The general-use communication media block 100 provided in the acceleration apparatus 10 according to an embodiment of the present disclosure will be described in more detail with reference to FIG. 4 as follows.

Figure 4:
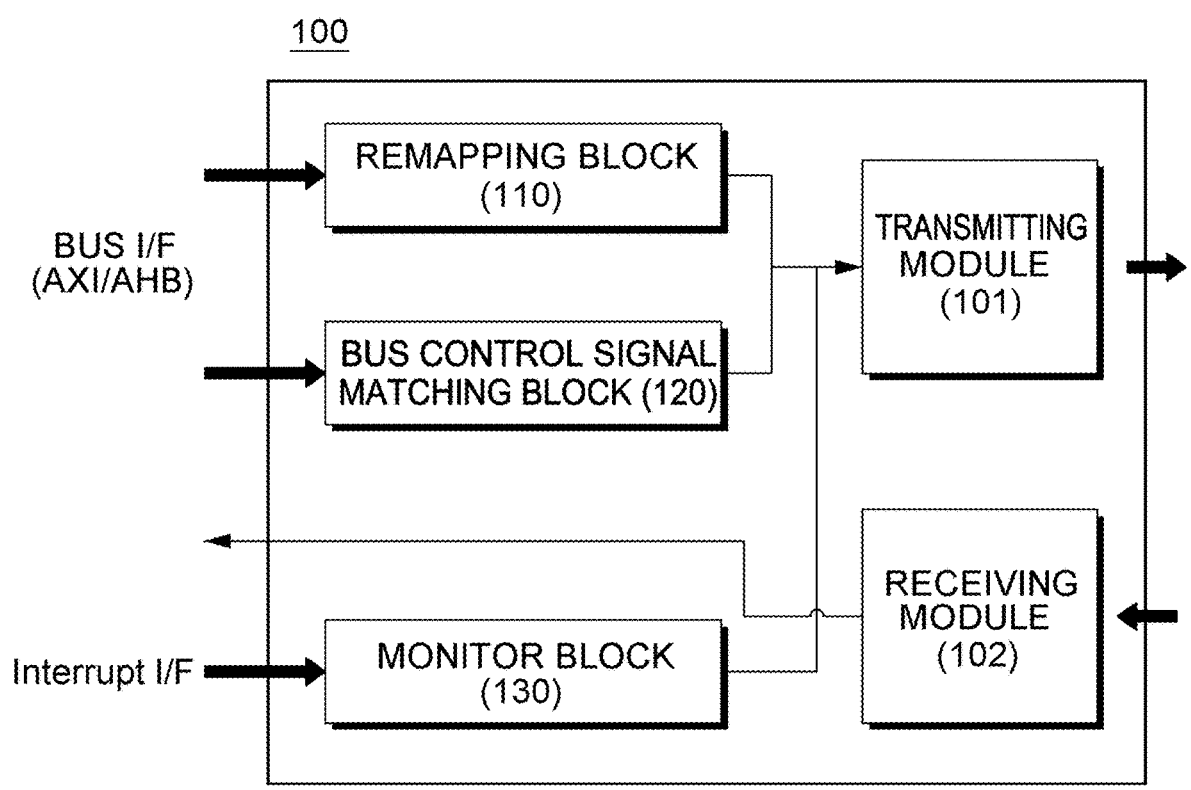
FIG. 4 is a diagram illustrating the detailed configuration of a general-use communication media block constituting the acceleration apparatus shown in FIG. 3.

FIG. 4 is a diagram illustrating the detailed configuration of a general-use communication media block constituting the acceleration apparatus shown in FIG. 3.

As shown in the drawing, the general-use communication media block 100 of the acceleration apparatus according to an embodiment of the present disclosure may include a remapping block 110, a bus control signal matching block 120, a monitor block 130, and a transmitting module 101 and a receiving module 102 corresponding to a transceiving interface.

According to an embodiment of the present disclosure, a plurality of acceleration apparatuses physically connected may transmit and receive a bus control signal (Bus ID, Burst, Size, R/W, etc.), a bus address signal, and a bus data signal through the general-use communication media block 100 and may receive a message generated by a processor and an interrupt signal.

Here, the remapping block 110 may serve to remap, according to a promise, a width of a bus ID signal and an address specifying a component of a receiver integrated circuit among signals applied from a bus master interface connected to a transmitter integrated circuit of the acceleration apparatus.

More specifically, the addresses of internal components applied by the integrated circuits of respective acceleration apparatuses are different, and if an arbitrary acceleration apparatus (transmitting side) tries to access a function block in a specific area address of another external device (receiving side) without taking the aforementioned differences into account, it is obvious the arbitrary acceleration apparatus cannot access the target area due to a collision of addresses. For example, unique addresses assigned to DDR, Flash, CPU and Video Codec are different for each accelerator. Therefore, for normal communication, a promise for address remapping is required in advance.

In addition, the remapping block 110 may perform bus ID remapping to match a width of a bus ID signal applied from a bus master interface with a width of a bus ID signal of a neighboring device (receiving side).

Here, in the AXI bus standard, since an address channel and a data channel are independently separated, it is not possible to connect the address and the data using a numerical access method, and hence, the address-data pair is matched using the bus ID. Due to the above-described use of the bus ID, a bus ID width may be different for each bus layer configuration, and this difference in bus configuration results in a difference in bus ID width. Therefore, it is required to match the bus ID width in order to communicate between the buses of different chips, and the matching means expanding or reducing a bus ID width as needed, and similarly to address remapping, the bus ID width has to be agreed upon with each other.

Therefore, it is preferable that a remapping block 110 includes a remapping appointment table that is referred to when performing remapping to match the address and the width of the bus ID signal.

In addition, in an embodiment of the present disclosure, the bus control signal matching block 120 may analyze a pattern of a bus control signal among signals applied from the bus master interface, when a previously applied bus control signal and a subsequently applied bus control signal are the same, cause the previously applied bus control to be reused, and therefore, when bus control signals are the same, the same signal may be caused to be reused, thereby maximizing the utilization of the I/O pins of the communication interface between acceleration apparatuses and accordingly improving the communication speed the maximum as a result.

In addition, according to an embodiment of the present disclosure, the monitor block 130 may monitor a message applied from the processor interface and all interrupt signals applied from the interrupt interface, and when using this to transmit an address signal and data between acceleration apparatuses, the monitor block 130 may transmit the message and the interrupt signals together, so that the interrupt signals and the message of the processor are transmitted with the highest priority, thus maximizing the communication efficiency.

Referring to FIGS. 2 to 4, a method for accelerating a neural network processing for the artificial neural network model shown in FIG. 2 with a hierarchical structure including an input layer and N hidden layers by using an artificial neural network computation acceleration apparatus for distributed processing, the apparatus which is composed of a single integrated circuit, will be described.

First, operation a1 of, in response to power being applied to the acceleration apparatus 10, storing the entire synapse weights for input neurons for an artificial neural network computation, which are stored in the external flash memory 1, in the external main memory in accordance with a control signal from the CPU 15 is performed.

Next, operation a2 of storing initial input data, which is input through the data input device 16, in the external main memory 11 is performed. Here, as in the embodiment of the present disclosure, when the input data is an image, image data input from a camera may be stored through the DMA module 13.

Next, operation a3 of storing the input data stored in the external main memory 11 and the synaptic weights corresponding to the input data in an internal buffer memory as much as needed for each cycle constituting the input layer of the artificial neural network is performed. In this case, all or part of the weights and input data may be stored according to the size of the artificial neural network.

Next, operation a4 of reading, by the neural network computation device 14, the synaptic weight and the input data, which are stored in the internal buffer memory 12 to correspond to each cycle constituting the artificial neural network, so as to perform an artificial neural network computation until completion of the computation for the entire layers, and storing a result of the computation in the external main memory 11 so as to use the result as input data for a next layer may be performed.

Here, when the weights and input data required for the computation are stored in the internal memory, the CPU 15 may transmit a computation start command to the neural network computation device 14, and the neural network computation device 14 may perform the computation by reading the weights and input data directly from the internal buffer memory 12 without passing through a bus. In this case, when the entire input data and the weights of the neural network cannot be stored in the internal memory, a process of storing and computing some of the input data and the weights in the internal memory 12 may be repeated until computations for the entire layers are completed.

Next, when a result of computation for the input layer is stored in the external main memory 11, a process of performing the operation a4 after synaptic weights and input data for the input neurons for the artificial neural network computation for the hidden layer are read from the external main memory 11 as much as needed for each cycle and then stored in the internal buffer memory may be repeatedly performed on N hidden layers in operation a5.

Figure 5:
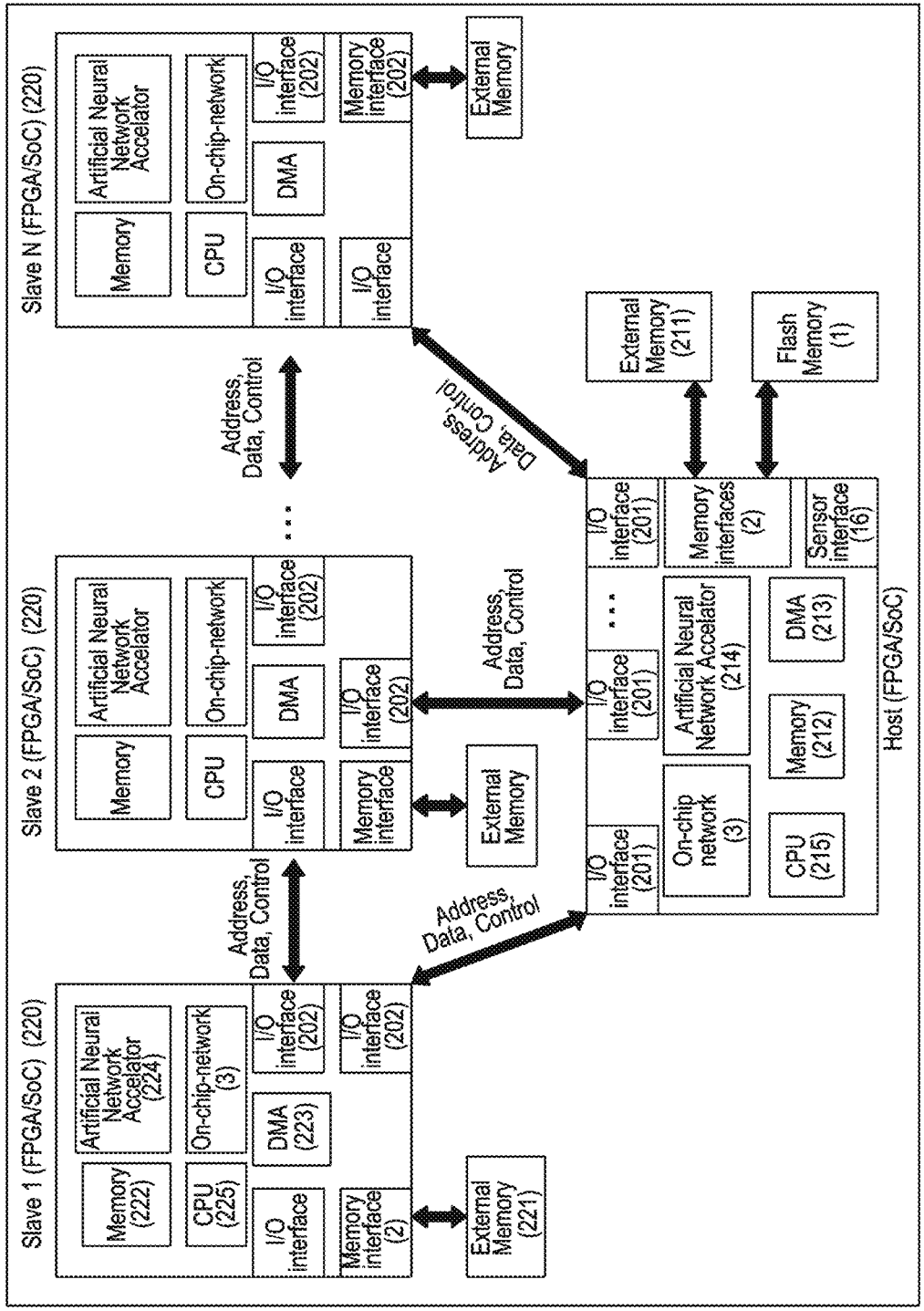
FIG. 5 is a block diagram schematically illustrating the configuration of multiple integrated circuits of an acceleration system for processing an artificial neural network computation in which input data has a plurality of depths according to an embodiment of the present disclosure.

FIG. 5 is a block diagram schematically illustrating the configuration of multiple integrated circuits of an acceleration system for processing an artificial neural network computation in which input data has a plurality of depths according to an embodiment of the present disclosure.

As shown in FIG. 5, an acceleration system 200 for processing an artificial neural network computation in which input data for input neurons has a plurality of depths according to an embodiment of the present disclosure may include a single host acceleration apparatus 210 and a plurality of slave acceleration apparatuses 220.

More specifically, the host acceleration apparatus 210 may be connected to a flash memory 1 in which the entire synaptic weights required for the artificial neural network computation is stored, and the host communication media block 201 may be provided in a number greater than or equal to the plurality of depths.

In addition, the slave acceleration apparatuses 220 may each include at least one slave communication media block 202 physically connected to the host communication media block 201 of the host acceleration apparatus 210, and may be provided in a plural number to respectively correspond to the number of depths.

In this case, the host acceleration apparatus 210 may process an artificial neural network computation by distributing synaptic weights and input data in a parallel manner to the slave acceleration apparatuses 220 related to each of the plurality of depths, and may perform a final computation by aggregating intermediate computation results of the slave acceleration apparatuses 220.

In an embodiment of the present disclosure, it is preferable that the host communication media block 201 and the slave communication media block 202 have the same configuration as that of the general-use communication media block 100 described above in FIG. 4, and detailed descriptions thereof will be omitted.

In addition, in an embodiment of the present disclosure, the host acceleration apparatus 210 and the slave acceleration apparatuses 220 may each be configured as an integrated circuit of any one of an SoC type and an FPGA type, and may perform transmission and reception with respect to each other, regardless of the type of integrated circuit, through the host communication media block 201 and the slave communication media block 202.

In addition, as shown in the drawing, the host acceleration apparatus 210 and the slave acceleration apparatuses 220 may each include an external main memory 211, 221, an internal buffer memory 212, 222, a DMA module 213, 223, a neural network computation device 214, 224, and a CPU 215, 225, and detailed descriptions of the same configuration as those shown in FIG. 3 will be omitted.

Next, embodiments of the acceleration system shown in FIG. 5 will be described with reference to FIGS. 6 and 7.

Figure 6:
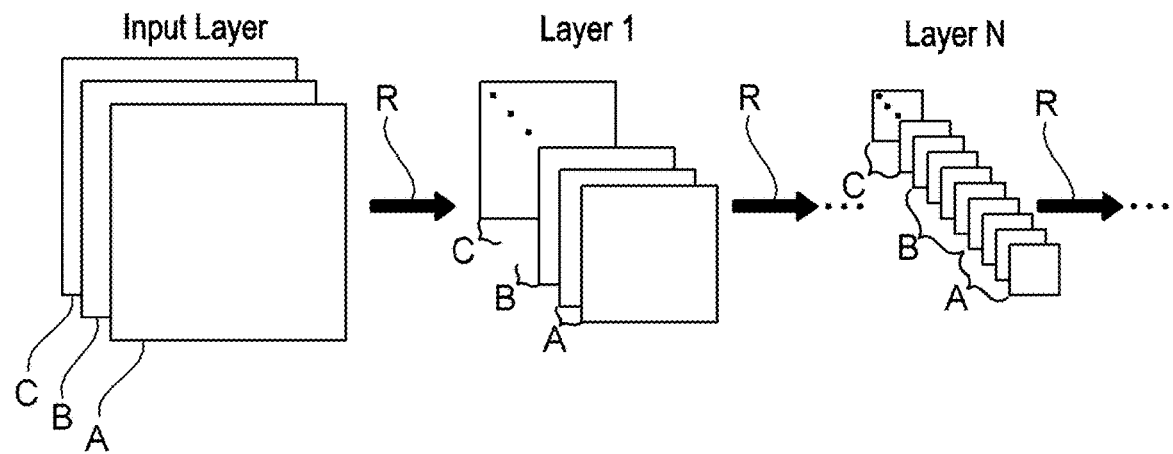
FIG. 6 is a diagram schematically illustrating an artificial neural network model according to an embodiment of the acceleration system shown in FIG. 5.

FIG. 6 is a diagram schematically illustrating an artificial neural network according to an embodiment of the acceleration system shown in FIG. 5, showing an artificial neural network model that processes the dimensions of the feature map of the input data by distributing the same into three depths of A, B, and C.

A process of implementing the artificial neural network model shown in FIG. 6 with the acceleration system shown in FIG. 5 will be described as follows.

First, operation b1 of, when all acceleration apparatuses are ready for computation as power is applied to the single host acceleration apparatus 210 and the plurality of slave acceleration apparatuses 220, storing entire synapse weights for input neurons for an artificial neural network computation, stored in the external flash memory 1 connected to the host acceleration apparatus 210, in the external main memory 211 of the host acceleration apparatus 210 may be performed.

Next, operation B2 of sequentially transmitting, by the host acceleration apparatus 210, synapse weights respectively corresponding to three depths of A, B, and C among the synapse weighs stored in the external main memory 211 of the host acceleration apparatus 210 in a parallel manner to each external main memory 221 of the plurality of slave acceleration apparatuses 220 through the general-use communication media block 201, 202 and storing the transmitted synapse weights therein may be performed.

Next, operation b3 of storing, in respective internal buffer memories 222 of the plurality of slave acceleration apparatuses 220, synapse weights required for each cycle constituting the input layer of the artificial neural network among the synapse weights stored in respective external main memories 221 of the plurality of slave acceleration apparatuses 220 may be performed.

Next, operation b4 of storing, by the single host acceleration apparatus 210, initial input data, which is input through the data input device 16, in the external main memory 211 of the host acceleration apparatus 210 may be performed, and in the embodiment of the present disclosure, in the case of image data, an input may be received through a sensor interface and may be received through a peripheral bus from other adjacent devices.

Next, operation b5 of transmitting, by the host acceleration apparatus 210, input data respectively corresponding to the three depths of A, B, and C among the input data stored in the external main memory 211 of the host acceleration apparatus 210 sequentially in a parallel manner to respective external main memories 221 of the plurality of slave acceleration apparatuses 220 through the general-use communication media block 201, 202 and storing the input data therein may be performed.

Next, operation b6 of storing, in the respective internal buffer memories 222 of the slave acceleration apparatuses 220, the input data stored in the respective external main memories 221 of the slave acceleration apparatuses 220 as much as needed for each cycle constituting the artificial neural network computation may be performed.

Next, operation b7 of reading, by respective neural network computation devices 224 of the slave acceleration apparatuses 220, the synapse weights and the input data, which are stored in the respective internal buffer memories 222 of the slave acceleration apparatuses 220 to correspond to each cycle constituting the artificial neural network, so as to perform an artificial neural network computation until completion of computations on the entire layers, and storing a result of the computation in the respective external main memories 221 of the slave acceleration apparatuses 220 may be performed.

Next, operation b8 of receiving, by the host acceleration apparatus 210, intermediate computation results stored in the respective external main memories 221 of the slave acceleration apparatuses 220, sequentially storing the received intermediate computation results in the respective external main memories 211 of the host acceleration apparatus 210, performing a final computation on the entire layer by aggregating the intermediate computation results, and storing a result of the final computation in the external main memory 211 of the host acceleration apparatus 210 may be performed.

Next, operation b9 of transmitting the final computation result, which is stored in the external main memory 211 of the host acceleration apparatus 210, sequentially in a parallel manner to the respective external main memories 221 of the three slave acceleration apparatuses in a way to correspond to the three depths so as to use the final computation result as input data for a computation of a next layer and storing the final computation result may be performed.

Next, operation b10 of storing, in respective internal buffer memories of the slave acceleration apparatuses, a synaptic weight required for each cycle constituting a next layer among the synaptic weights stored in the respective external main memories of the plurality of slave acceleration apparatuses may be performed.

Lastly, operation b11 of repeatedly performing the operations b6 to b10 until computations on the entire layers for the input data are completed may be performed.

Figure 7:
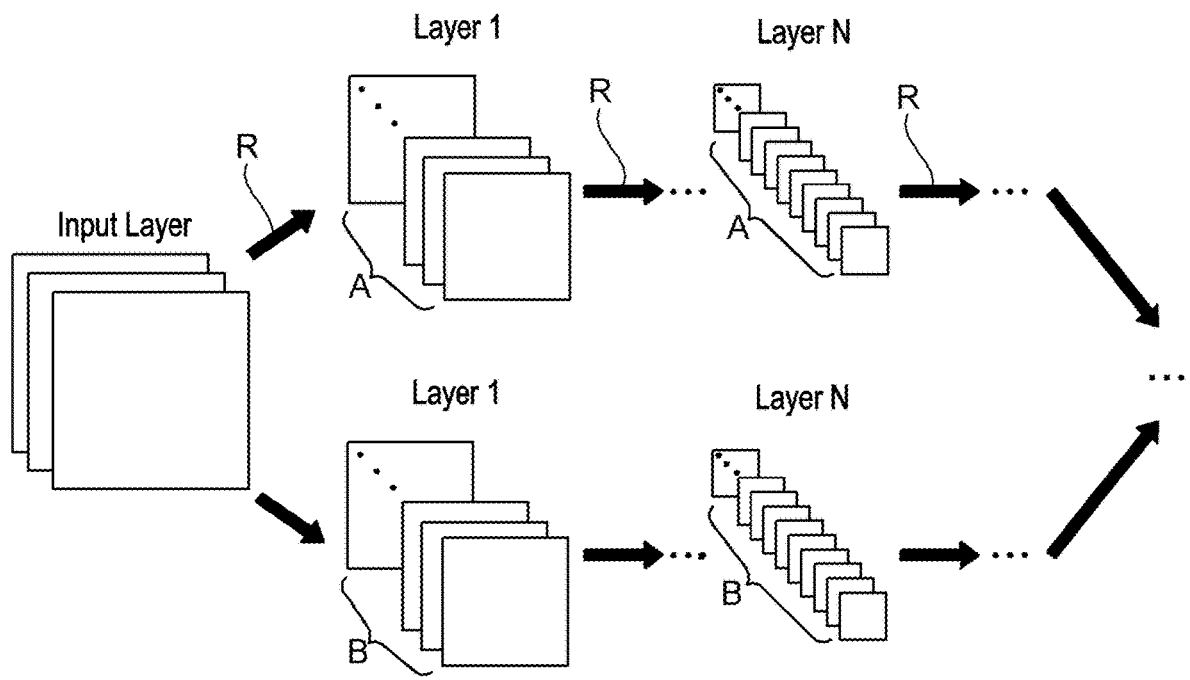
FIG. 7 is a diagram schematically illustrating an artificial neural network model according to another embodiment of the acceleration system shown in FIG. 5.

FIG. 7 is a diagram schematically illustrating an artificial neural network according to another embodiment of the acceleration system shown in FIG. 5.

FIG. 7 is a schematic diagram of an artificial neural network according to another embodiment of the acceleration system shown in FIG. 5, which is a diagram illustrating an artificial neural network model corresponding to AlexNet that logically excludes the input layer and the output layer from dimensions of a feature map constituting input data and performing parallel processing by independently distributing into two depths of A and B.

As such, when the artificial neural network is independently separated, intermediate computation results for the remaining output layers except for each input layer and output layer do not need to be transmitted to the host acceleration apparatus for each computation on each layer and collected and post-processed, and therefore, compared with the model shown in FIG. 6, an optimal distributed processing method may be provided because it is possible to avoid the data transmission time between acceleration apparatuses.

A process of implementing the artificial neural network model shown in FIG. 7 with the acceleration system shown in FIG. 5 will be described as follows.

First, operation c1 of, in response to power being applied to the single host acceleration apparatus 210 and the two slave acceleration apparatuses A and B, storing entire synapse weights for input neurons for an artificial neural network computation, which are stored in the external flash memory 1, in the external memory 211 of the host acceleration apparatus may be performed.

Next, operation c2 of transmitting, by the host acceleration apparatus 210, synapse weights respectively corresponding to the two depths among synapse weights stored in the external main memory 211 of the host acceleration apparatus 210 sequentially in a parallel manner to the respective external main memories 221 of the plurality of slave acceleration apparatuses 220 through the general-use communication media block 201, 202 and storing the transmitted synapse weights therein may be performed.

Next, operation c3 of storing, in the respective internal buffer memories 222 of the slave acceleration apparatuses 220, a synapse weight required for each cycle constituting the input layer of the artificial neural network among the synapse weights stored in the respective external main memories 221 of the plurality of slave acceleration apparatuses 220 may be performed.

Next, operation c4 of storing, by the single host acceleration apparatus 210, initial input data, which is input through the data input device 16, in the external main memory 211 of the host acceleration apparatus 210 may be performed.

Next, operation c5 of storing, by the host acceleration apparatus 210, the input data and the synapse weights, which are stored in the external main memory 211, in the internal buffer memory 212 as much as needed for a cycle constituting the input layer of the neural network, performing a neural network computation for the input layer using the neural network computation device 214, and storing a result of the computation in the external main memory 211 so as to use the result as input data for a next layer may be performed.

Next, operation c6 of transmitting, by the host acceleration apparatus 210, input data (computation results) respectively corresponding to the plurality of depths among the input data (computation results) stored in the external main memory 211 of the host acceleration apparatus 210 sequentially in parallel to the respective external main memories 221 of the plurality of slave acceleration apparatuses 220 through the general-use communication media block 201, 202 and storing the transmitted input data therein may be performed.

Next, operation c7 of storing the input data (computation results of the input layer) stored in the respective external main memories 221 of the slave acceleration apparatuses 220 and synapse weights corresponding to the input data in the respective internal buffer memories 222 of the slave acceleration apparatuses 220 as much as needed for each cycle constituting the artificial neural network may be performed.

Next, operation c8 of repeatedly reading, by respective neural network computation devices 224 of the slave acceleration apparatuses 220, the synapse weights and the input data, which are stored in the internal buffer memories 222 of the slave acceleration apparatuses 220 to correspond to each cycle constituting the artificial neural network, so as to repeatedly perform an artificial neural network computation until completion of computation on entire layers constituting the artificial neural network, and storing a result of the computation in the respective external main memories 221 of the slave acceleration apparatuses 220 may be performed.

Lastly, operation c9 of receiving, by the host acceleration apparatus 210, intermediate computation results stored in the respective external main memories 221 of the slave acceleration apparatuses 220, storing the received intermediate computation results sequentially in the external main memory 211 of the host acceleration apparatus 210, performing a final computation on the entire neural network by aggregating the computation results, and storing a result of the final computation in the external main memory 211 of the host acceleration apparatus 210 may be performed.

As described above, regarding a method for accelerating an artificial neural network in which input data for input neurons has a plurality of depths according to the present disclosure, it is possible to perform distributed processing of the input data and synapse weights for the input neurons to acceleration apparatuses respectively corresponding to the plurality of depths.

Figure 8:
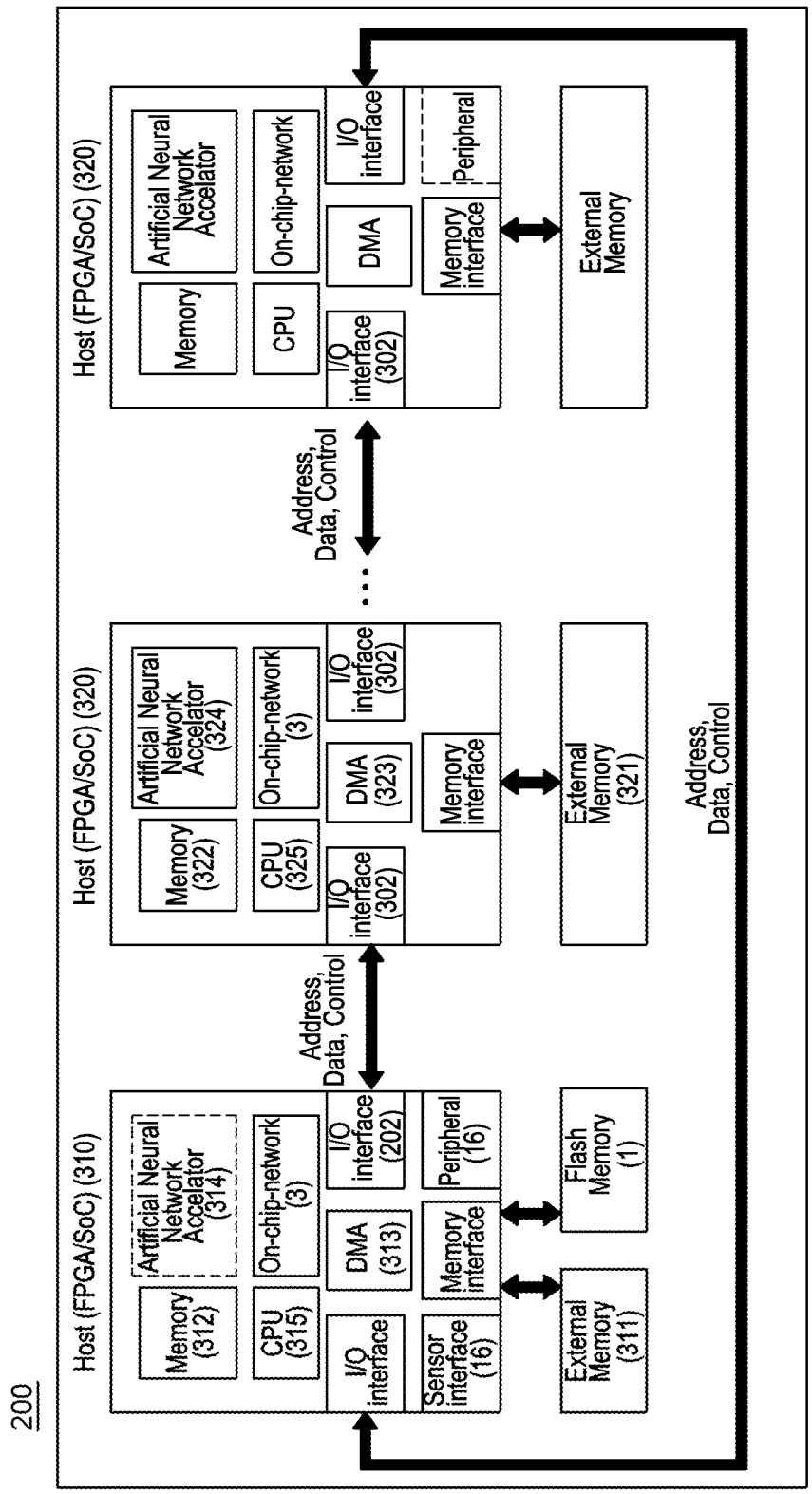
FIG. 8 is a block diagram schematically illustrating the configuration of multiple integrated circuits of an acceleration system for processing a computation of an artificial neural network in which input neurons are configured with a plurality of layers.

FIG. 8 is a block diagram schematically illustrating the configuration of multiple integrated circuits of an acceleration system for processing a computation of an artificial neural network in which input neurons are configured with a plurality of layers.

As shown in the drawing, the acceleration system 300 for processing a computation of an artificial neural network in which input neurons are configured with a plurality of layers according to an embodiment of the present disclosure may include a host acceleration apparatus 310, and a plurality of slave acceleration apparatuses 320.

More specifically, the host acceleration apparatus 310 may be connected to a flash memory 1 in which the entire synaptic weights required for the computation of the artificial neural network are stored, and may have at least one pair of host communication media blocks 301 for transmission and reception.

In addition, the slave acceleration apparatuses 320 may be provided in plural with at least one pair of slave communication media blocks 302 so as to be sequentially connected to the host acceleration apparatus 310 to form a pipeline as a whole.

Accordingly, the acceleration system 300 for processing a computation of an artificial neural network in which input neurons are configured with a plurality of layers according to an embodiment of the present disclosure may be enabled to process an artificial neural network computation by sequentially distributing, into the host acceleration apparatus 310 and the slave acceleration apparatus 320, synapse weights and input data for the input neurons constituting the artificial neural network computation.

In addition, in the embodiment of the present disclosure, it is preferable that the host communication media blocks 301 and the slave communication media blocks 302 have the same configuration as that of the general-use communication media block 100 described above in FIG. 4, and detailed descriptions thereof will be omitted.

In addition, in an embodiment of the present disclosure, the host acceleration apparatus 310 and the slave acceleration apparatuses 320 may each be configured as an integrated circuit of any one of an SoC type and an FPGA type, and may perform transmission and reception with respect to each other, regardless of the type of integrated circuit, through the host communication media blocks 301 and the slave communication media blocks 302.

In addition, as shown in the drawing, the host acceleration apparatus 310 and the slave acceleration apparatuses 320 may each include an external main memory 311, 321, an internal buffer memory 312, 322, a DMA module 313, 323, a neural network computation device 314, 324, and a CPU 315, 325, and detailed descriptions of the same configurations as those shown in FIG. 3 will be omitted.

Figure 9:
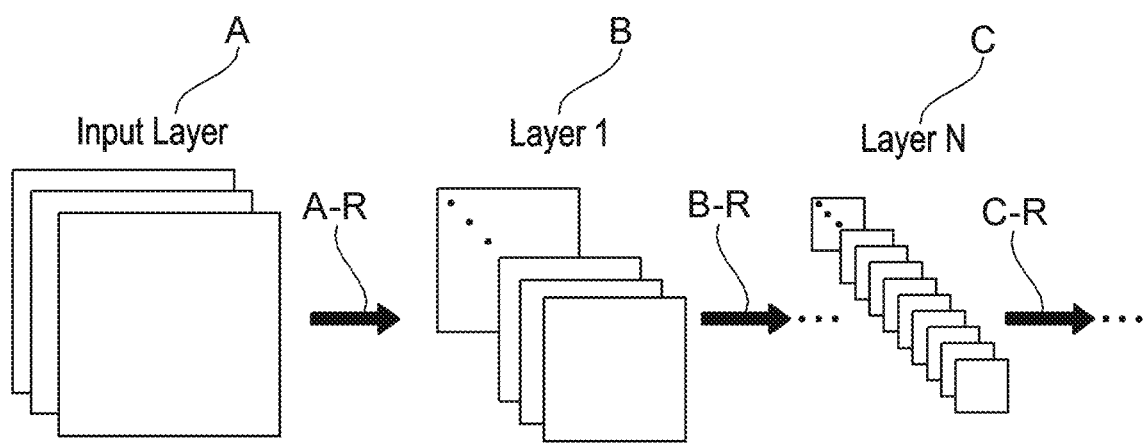
FIG. 9 is a diagram schematically illustrating an artificial neural network model according to an embodiment of the acceleration system shown in FIG. 8.

FIG. 9 is a diagram schematically illustrating an artificial neural network model according to an embodiment of the acceleration system shown in FIG. 8.

In order to explain the process of implementing the artificial neural network model shown in FIG. 9 with the acceleration system shown in FIG. 8, a connection structure between a single host acceleration apparatus and a plurality of slave acceleration apparatuses may be sequentially arranged to form a pipe line as a whole using the artificial neural network system described with reference to FIG. 8.

First, in a method of accelerating processing of an artificial neural network having a hierarchical structure according to an embodiment of the present disclosure, operation d1 of, in response to power being applied to the single host acceleration apparatus 310 and the plurality of slave acceleration apparatuses 320, storing entire synapse weights for input neurons for an artificial neural network computation, which are stored in the external flash memory 1, in the external main memory 311 of the host acceleration apparatus 310 may be performed.

Next, operation d2 of sequentially transmitting, by the host acceleration apparatus 310, synapse weights respectively corresponding to the N layers among the synapse weights stored in the external main memory 311 of the host acceleration apparatus 310 to the respective external main memories 321 of the plurality of the slave acceleration apparatuses 320 through the general-use communication media block 301, 302 and storing the transmitted synapse weights therein may be performed.

Next, operation d3 of storing, by the single host acceleration apparatus 310, input data of an input layer, which is input through the data input device 16, in the external main memory of the host acceleration apparatus 310 may be performed.

Next, operation d4 of storing the input data and the synapse weights of the input layer, which are stored in the external main memory 311 of the host acceleration apparatus 310, in the internal buffer memory 312, may be performed.

Next, operation d5 of reading, by the neural network computation device 314 of the host acceleration apparatus 310, the synapse weights and the input data, which are stored in the internal buffer memory 312, so as to perform a neural network computation for the input layer and storing a result of the computation in the external main memory 311 may be performed.

Next, operation d6 of storing the result of the computation in an external main memory 321 of a slave acceleration apparatus 320 corresponding to a next layer as input data, and then storing input data and a synapse weight corresponding to the corresponding layer in the internal buffer memory 322 of the slave acceleration apparatus 320 may be performed.

Next, operation d7 of reading, by the neural network computation device 324 of the slave acceleration apparatus 320, the synapse weights and the input data, which are stored in the internal buffer memory 322, so as to perform a neural network computation for the corresponding layer and storing a result of the computation in the external main memory 321 may be performed.

Next, operation 8 of repeatedly performing the operations d6 and d7 on N hidden layers and storing a final computation result in the external main memory 311 of the host acceleration apparatus 310 or transmitting the same to a peripheral device may be performed.

Meanwhile, according to an embodiment of the present disclosure, when a neural network having N layers is distributed and processed, the N layers may be divided by the number of slaves or may be independently allocated to the slaves in proportion to the amount of computation on each layer.

As such, when the acceleration apparatuses are distributed into layers and thus allocated for the respective layers, it is possible to form a pipeline, thereby increasing the efficiency of computation for continuous stream inputs.

Accordingly, regarding a method for accelerating an artificial neural network in which input neurons are formed in a structure having a plurality of layers according to the present disclosure, it is possible to provide a method for distributed processing of input data and synapse weights for input neurons to acceleration apparatuses respectively corresponding to the plurality of layers.

Figure 10:
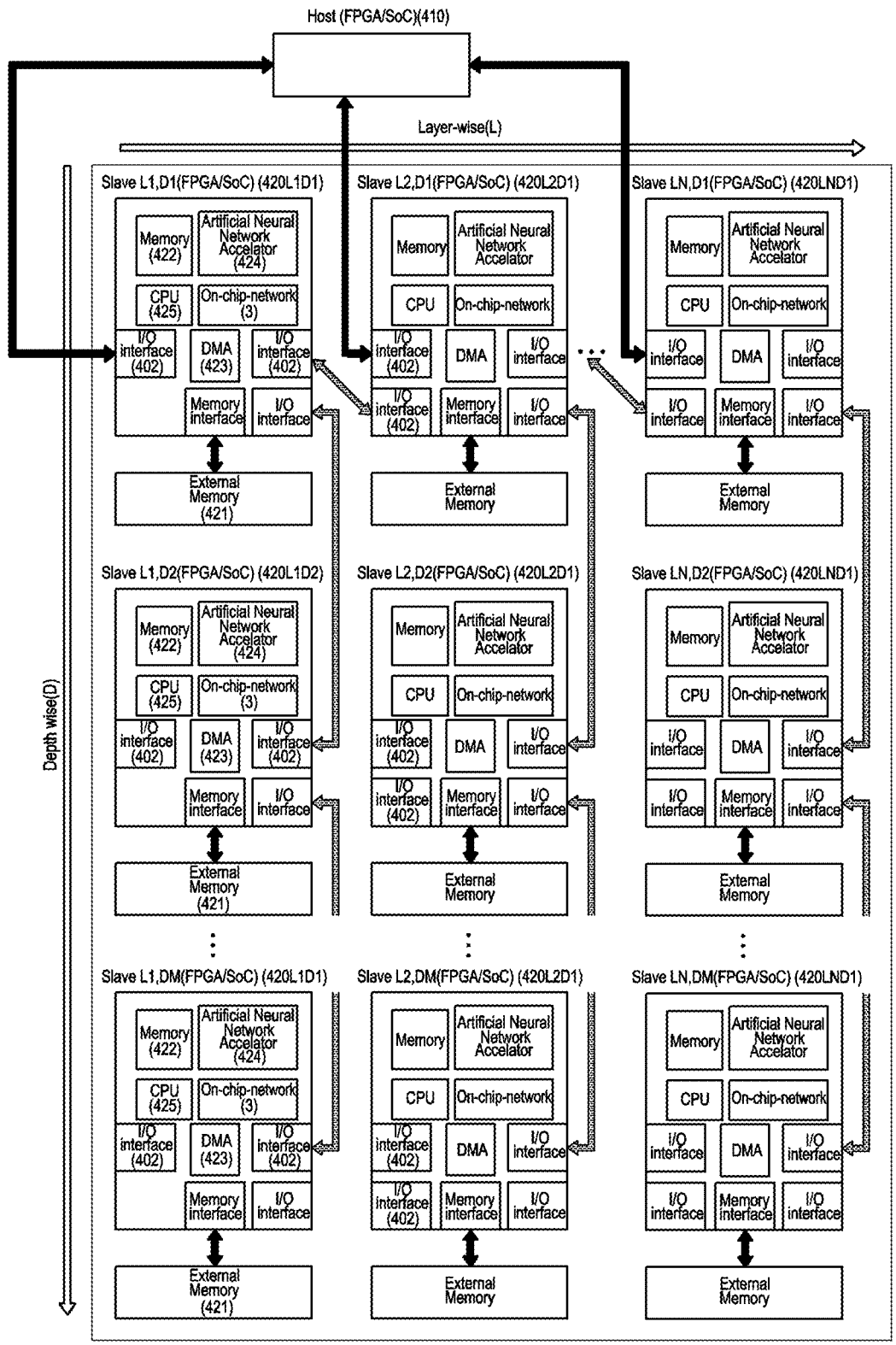
FIG. 10 is a block diagram schematically illustrating the configuration of multiple integrated circuits of an acceleration system for processing a computation of an artificial neural network which input data for input neurons is configured with a plurality of (M) depths and a plurality of (N) layers.

FIG. 10 is a block diagram schematically illustrating the configuration of multiple integrated circuits of an acceleration system for processing a computation of an artificial neural network which input data for input neurons is configured with a plurality of (M) depths and a plurality of (N) layers.

As shown in the drawing, an acceleration system for processing an artificial neural network computation in which input data for input neurons is composed of a plurality of (M) depths and a plurality of (N) layers according to an embodiment of the present disclosure may include a host acceleration apparatus 410 and a plurality of slave acceleration apparatuses 420.

More specifically, the host acceleration apparatus 410 may be connected to a flash memory (not shown) in which the entire synaptic weights required for the artificial neural network computation is stored, and may have a host communication media block (not shown) in the number of the plurality of (N) layers or more.

In addition, the slave acceleration apparatuses 420 may include one or more slave communication media blocks 402 to be connected to a host communication media block of the host acceleration apparatus 410 or to be connected to another acceleration apparatus, and may be formed in a plural number to respectively correspond to computation cycles (M×N) required for a plurality of (M) depths and a plurality of (N) layers.

In addition, in the embodiment of the present disclosure, it is preferable that the host communication media block and the slave communication media block 402 have the same configuration as that of the general-use communication media block 100 described above in FIG. 4, and detailed descriptions thereof will be omitted.

In addition, in an embodiment of the present disclosure, the host acceleration apparatus 410 and the slave acceleration apparatuses 420 may each be configured as an integrated circuit of any one of an SoC type and an FPGA type, and may perform transmission and reception with respect to each other, regardless of the type of integrated circuit, through the host communication media block and the slave communication media block 402.

In addition, as shown in the drawing, the host acceleration apparatus 410 and the slave acceleration apparatuses 420 may each include an external main memory 421, an internal buffer memory 422, a DMA module 423, a neural network computation device 424, and a CPU 425, and detailed descriptions of the same configuration as the configuration shown in FIG. 3 will be omitted.

As shown in the drawing, when the number of depths and layers of data for input neurons of the artificial neural network are large, it may be difficult to satisfy the required target performance with a single or a few number of acceleration apparatuses.

In this case, the depth distributing method and the layer distributing method of FIGS. 5 to 9 described above are simultaneously applied to independently perform computation by distributing the depths and the layers to the acceleration apparatus according to the present disclosure, thereby increasing the computation performance.

In this case, as shown in the drawing, the host acceleration apparatus 410 transmits a weight and input data for an artificial neural network computation to an upper input terminal among the slave acceleration apparatuses 420 which constitute respective layers, and when all computations are completed, a final computation result is received from the last layer among the slave acceleration apparatuses.

Referring to the drawing, L of the slave acceleration apparatus 420 denotes an allocated layer, the number of which can be expressed as 1 to N, and D denotes the allocated depth (or Depth), the number of which can be expressed as 1~M.

Figure 11:
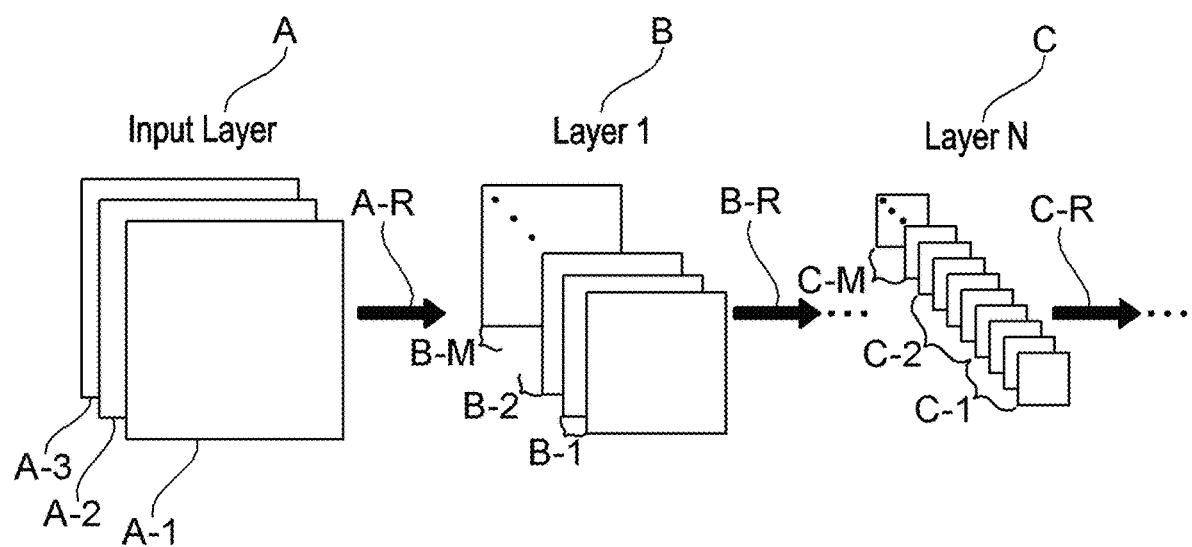
FIG. 11 is a diagram schematically illustrating an artificial neural network model according to an embodiment of the acceleration system shown in FIG. 10.

FIG. 11 is a diagram schematically illustrating an artificial neural network model according to an embodiment of the acceleration system shown in FIG. 10.

When the acceleration system of FIG. 10 is described with reference to FIG. 11, the slave acceleration apparatus may be allocated in the direction of Slave(L1,D1) to Slave(L1,DM) for computation of A-1, A-2, and A-3 of the input layer and other layers may be allocated in the same manner.

Meanwhile, respective slave accelerators may be variably allocated according to computational power of an acceleration apparatus and the number of acceleration apparatuses.

A process of implementing the artificial neural network model shown in FIG. 11 with the acceleration system shown in FIG. 10 will be described as follows.

First, operation e1 of storing, in response to power being applied to a single host acceleration apparatus 410 and a plurality of slave acceleration apparatuses 420, entire synaptic weights for input neurons for an artificial neural network computation, which are stored in an external flash memory, in an external main memory of the host acceleration apparatus 410 may be performed.

Next, operation e2 of transmitting, by the host acceleration apparatus 410, entire synapse weights respectively corresponding to the N layers among the synapse weights stored in the external main memory of the host acceleration apparatus sequentially through the general-use communication media block to respective external main memories of N slave acceleration apparatuses 420L1D1, 420L2D1, and 420LND1 corresponding to a first depth of each layer among M depths constituting each layer, and storing the corresponding synapse weights in entire slave acceleration apparatuses connected to the N slave acceleration apparatuses and corresponding to different depths may be performed.

Next, operation e3 of storing, by the single host acceleration apparatus 410, input data of an input layer, which is input through a data input device, in an external main memory of the host acceleration apparatus 410 may be performed.

Next, regarding the input data of the input layer which is stored in the external main memory of the host acceleration apparatus 410, operation e4 of primarily storing the entire input data of the corresponding input layer in the external main memory 421 of the slave acceleration apparatus 420L1D1 corresponding to a first depth of the input layer and sequentially storing the corresponding input data in a distributed manner in the external main memories of M slave acceleration apparatuses corresponding to depths constituting the input layer may be performed.

Next, operation e5 of storing input data and a synaptic weight of the corresponding layer in the internal buffer memories 422 of the M slave acceleration apparatuses constituting the input layer may be performed.

Next, operation e6 of performing, by the neural network computation devices of the M slave acceleration apparatuses constituting the input layer, a neural network computation and storing a result of the computation in an external main memory thereof may be performed.

Next, operation e7 of transmitting computation results stored in the M slave acceleration apparatuses to the slave acceleration apparatus 420L1D1 corresponding to the first depth of the input layer so as to perform a final computation on the corresponding layer, and transmitting a result of the final computation to the slave acceleration apparatus 420L2D1 corresponding to a first depth of a next layer as input data of the corresponding layer may be performed.

Operation e8 of primarily storing, in the external main memory of the slave acceleration apparatus corresponding to the first depth of the next layer, the entire input data of the corresponding layer and sequentially storing the corresponding input data in a distributed manner in the external main memories of the M slave acceleration apparatuses constituting the corresponding layer may be performed.

Operation e9 of repeatedly performing the same process as in the operations e5 to e8 until completion of computation on the N-th layer and transmitting a final computation result to the host acceleration apparatus may be performed.

As described above, regarding a method for accelerating an artificial neural network in which input data for input neurons are formed in a structure having a plurality of depths and a plurality of layers according to the present disclosure, it is possible to provide a method for distributed processing of input data and synapse weights for the input neurons to acceleration apparatuses respectively corresponding to a plurality of depths respectively constituting a plurality of layers.

Figure 12:
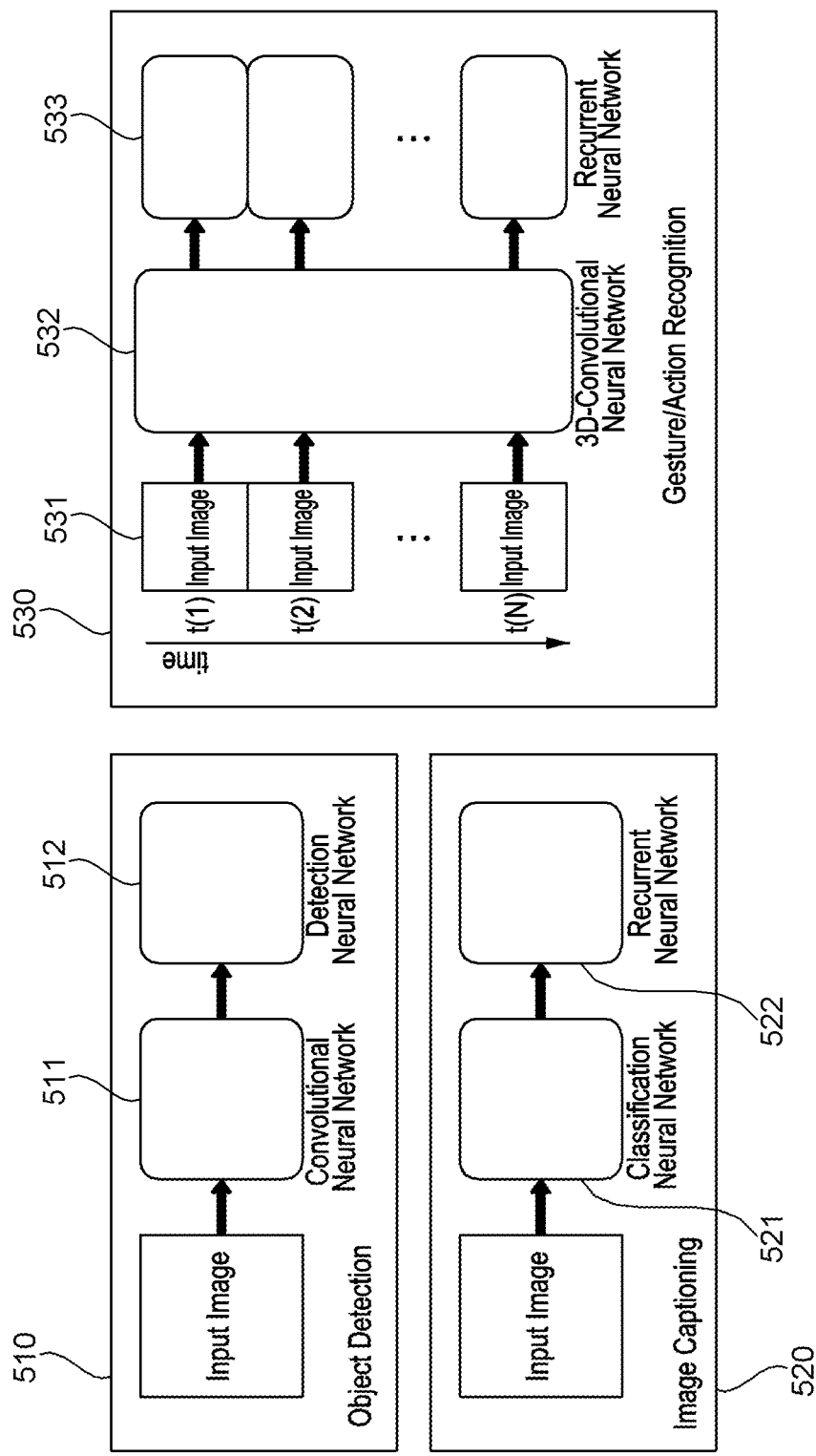
FIG. 12 is a diagram schematically illustrating a hybrid artificial neural network model composed of a plurality of artificial neural networks according to an embodiment of the present disclosure.

FIG. 12 is a diagram schematically illustrating a hybrid artificial neural network model composed of a plurality of artificial neural networks according to an embodiment of the present disclosure.

As shown in the drawing, in an embodiment of the present disclosure, three examples of a hybrid artificial neural network model are shown.

First, a first example of an artificial neural network model according to an embodiment of the present disclosure is a first hybrid artificial neural network 510 for object detection.

Here, a first hybrid artificial neural network 510 may include a neural network 511 for extracting a feature of an object from an input image and a neural network 512 for detecting a position of the object in the input image.

Next, a second example of the artificial neural network model according to an embodiment of the present disclosure is a second hybrid artificial neural network 520 for image captioning.

Here, the second hybrid artificial neural network 520 may include a neural network 521 for classifying an object in an image and a neural network 522 for generating a caption on the classified object to describe the image.

In this case, since the second hybrid artificial neural network 520 for the image caption processes image data, the size of the artificial neural network is relatively larger than that of a general neural network.

Therefore, in order to increase computational performance, the second composite artificial neural network 520 may be divided into the two artificial neural networks 521 and 522, and then allocated to the respective artificial neural networks in a distributed manner to correspond to the depths, the layers, and both of the depths and layers.

In particular, in the case of the neural network 522 that generates a caption on an object classified to describe an image, since memory cells can be sequentially connected in a time series order, it is preferable to perform distributed processing using an artificial neural network acceleration system based on the hierarchical structure shown in FIG. 8.

Meanwhile, a hybrid artificial neural network 530 according to a third embodiment of the hybrid artificial neural network model of the present disclosure may include an artificial neural network 533 that extracts a feature of the input data 531, which can be arranged in a time series, such as a video or a stream of images, through a 3-dimensional Convolutional Neural Network 532, into which the convolutional neural network is extended on the time axis, and determines the correlation and temporal continuity between features to recognize a gesture and a behavior.

In this case, like the 3D convolutional neural network, a neural network with a large amount of computation for processing continuous image data may perform distributed processing by dividing internal neural networks based on the above-described depth, layer, and time series.

As described above, a hybrid artificial neural network acceleration system composed of a plurality of artificial neural networks by one or more artificial neural network acceleration system may perform distributed processing on input data and synapse weights for input neurons by dividing the input data and the synapse weights for input neurons into artificial neural network units constituting the plurality of artificial neural networks.

As described above, the present disclosure has an effect of providing an artificial neural network computation acceleration apparatus, an acceleration system, and an acceleration method therefor, the apparatus which performs distributed processing by distributing, regardless of the type of integrated circuit, data and synapse weights for input neurons required for computation of an artificial neural network into a plurality of artificial neural network computation acceleration apparatuses each having a general-use communication media block that enables communication mediation, and therefore, it is possible to satisfy performance required for an artificial neural network computation even without use of high-power and high-cost hardware, such as GPGPU, but also to flexibly design the artificial neural network according to target performance.

In addition, the present disclosure allows a neural network computation to be performed by connecting a plurality of acceleration apparatuses composed of low-power/low-cost integrated circuits, and thus, it is possible to reduce manufacturing cost compared to using expensive GPGPU implemented as a single hardware according to an existing technology and to apply the present disclosure to fields where low power is required.

In addition, the present disclosure implements a general-use communication media block capable of communication mediation in an acceleration apparatus regardless of the type of integrated circuit, so an additional function may be flexibly applied to an acceleration system implemented as integrated circuits composed of the same type or different types, and thus, there is an effect of actively coping with the various needs of users.

In addition, the present disclosure performs distributed processing on an artificial neural network with multiple acceleration apparatus and thus there is an effect of flexibly expanding or reducing the acceleration apparatuses according to target performance.

In addition, the present disclosure divides input data and synaptic weights for neurons constituting an artificial neural network into units of depth constituting the input data, hierarchical structure, neural network, or a combination thereof, so that the computation can be performed in each acceleration apparatus, and thus, in the case of hardware implementation, memory and peripheral devices may be optimized, resulting in lower product development costs.

In addition, the present disclosure implements an acceleration system using various types of integrated circuits, and thus there is an effect that the present disclosure can be actively in various types of artificial neural network structures to be applied in the future.

Although the present disclosure has been described in detail so far, it will be apparent that the embodiments mentioned in the description are merely illustrative but not limitative, and it will be understood that various changes in form and details may be made therein without departing from the spirit and scope of the present disclosure as defined by the following claims.

The invention claimed is:

1. An artificial neural network computation acceleration apparatus for distributed processing a computation of an artificial neural network in which input neurons are hierarchically configured, the apparatus comprising:
an external main memory configured to store input data and synaptic weights for the input neurons;
an internal buffer memory configured to store a synaptic weight and input data required for each cycle of the computation of the artificial neural network among the synaptic weights and the input data stored in the external main memory;
a DMA module configured to directly transmit and receive data to and from the external main memory and the internal buffer memory;
a neural network computation device configured to repeatedly process, for each cycle of the computation of the artificial neural network, a series of sequential steps of reading the synaptic weight and the input data stored in the internal buffer memory so as to perform the computation of the artificial neural network and store a computation result in the external main memory;

a CPU configured to control an operation of storing the input data and the synaptic weights for the input neurons in the external main memory and the internal buffer memory, and an operation of the neural network computation device; and a general-use communication media block configured to transmit/receive the input data and the synaptic weights for the input neurons and a result of the artificial neural network computation performed by the neural network computation device to/from another acceleration apparatus physically connected regardless of a kind of an integrated circuit, wherein the general-use communication media block includes a remapping block, a bus control signal matching block, and a monitor block, wherein the remapping block is configured to remap a width of a bus ID signal and an address specifying a component of a receiver integrated circuit among signals applied from a bus master interface connected to a transmitter integrated circuit, wherein the bus control signal matching block is configured to analyze a pattern of a bus control signal among the signals applied from the bus master interface and, when a previously applied bus control signal and a subsequently applied bus control signal are the same, configured to reuse the previously applied bus control signal, and wherein the monitor block is configured to monitor a message applied from a processor interface and interrupt signals applied from an interrupt interface, and transmit the message and the interrupt signals together.

2. The apparatus of claim 1, further comprising:
a data input device configured with a sensor interface or a peripheral bus.

3. The apparatus of claim 1, further comprising:
an external flash memory configured to store entire synaptic weights required for a process of performing the artificial neural network computation.

4. The apparatus of claim 1, wherein the general-use communication media block is configured to enable communication mediation when the integrated circuit is a System on Chip (SoC) or a Field Programmable Gate Array (FPGA).

5. An artificial neural network acceleration system for processing a computation of an artificial neural network in which input data for input neurons are configured with a plurality of depths and a plurality of layers, the system comprising:

a host acceleration apparatus connected to a flash memory in which synaptic weights required for the artificial neural network computation are stored, and having host communication media blocks in a number greater than or equal to the number of the plurality layers; and a plurality of slave acceleration apparatuses each having at least one slave communication media block physically connected to each of the host communication media blocks of the host acceleration apparatus, the slave acceleration apparatuses being configured to respectively correspond to the number of cycles required for the plurality of depths and the plurality of layers, wherein the number of the cycles is the number of the plurality of depths multiplied by the number of the plurality of layers, wherein each of the plurality of host communication media blocks and the at least one slave communication media block includes a remapping block, a bus control signal matching block, and a monitor block, wherein the remapping block is configured to remap a width of a bus ID signal and an address specifying a component of a receiver integrated circuit among signals applied from a bus master interface connected to a transmitter integrated circuit, wherein the bus control signal matching block is configured to analyze a pattern of a bus control signal among the signals applied from the bus master interface and, when a previously applied bus control signal and a subsequently applied bus control signal are the same, configured to reuse the previously applied bus control signal, and wherein the monitor block is configured to monitor a message applied from a processor interface and interrupt signals applied from an interrupt interface, and to transmit the message and the interrupt signals together.

6. The system of claim 5, wherein each of the host acceleration apparatus and the plurality of slave acceleration apparatus is configured as an integrated circuit of any one of System on Chip (SoC) and Field Programmable Gate Array (FPGA), and wherein each of the host acceleration apparatus and the plurality of slave acceleration apparatus is configured to perform transmission and reception with respect to each other, regardless of a kind of the integrated circuit, through the host communication media block and the slave communication media block.

7. The system of claim 6, wherein each of the host acceleration apparatus and the slave acceleration apparatuses further comprises:

an external main memory configured to store the input data and the synaptic weights for input neurons;

an internal buffer memory configured to store a synaptic weight and input data required for each cycle of an artificial neural network computation among the synaptic weights and the input data stored in the external main memory;

a DMA module configured to directly transmit and receive data to and from the external main memory and the internal buffer memory;

a neural network computation device for repeatedly processing, for each cycle of the artificial neural network computation, a series of sequential steps of reading the synaptic weight and the input data stored in the internal buffer memory so as to perform the artificial neural network computation and storing the computation result in the external main memory; and a CPU configured to control an operation of storing the input data and the synaptic weights for the input neurons in the external main memory and the internal buffer memory, and an operation of the neural network computation device.

8. A hybrid artificial neural network acceleration system comprising a plurality of artificial neural networks of the system of claim 5, wherein distributed processing is performed on the input data and the synaptic weights for input neurons by dividing the input data and the synaptic weights for input neurons into artificial neural network units of the plurality of artificial neural networks.

9. An artificial neural network acceleration method for accelerating processing of an artificial neural network, the network which comprises a host acceleration apparatus and a plurality of slave acceleration apparatuses so that input data for input neurons is configured with M depths and N layers, the method comprising:

a first operation (e1) of storing, in response to power being applied to the host acceleration apparatus and the plurality of slave acceleration apparatuses, synaptic weights for input neurons for an artificial neural network computation in an external main memory of the host acceleration apparatus, wherein the external main memory is an external flash memory;

a second operation (e2) of transmitting, by the host acceleration apparatus, the synaptic weights respectively corresponding to the N layers among the synaptic weights stored in the external main memory of the host acceleration apparatus sequentially through a general-use communication media block to respective external main memories of N slave acceleration apparatuses corresponding to a first depth of each layer among M depths of each layer, and storing the corresponding synaptic weights in the plurality of slave acceleration apparatuses connected to the N slave acceleration apparatuses and corresponding to different depths;

a third operation (e3) of storing, by the host acceleration apparatus, input data of an input layer, which is input through a data input device, in the external main memory of the host acceleration apparatus;

regarding the input data of the input layer which is stored in the external main memory of the host acceleration apparatus, a fourth operation (e4) of primarily storing input data of a corresponding input layer in an external main memory of a slave acceleration apparatus corresponding to a first depth of the input layer and then sequentially storing the corresponding input data in a distributed manner in external main memories of M slave acceleration apparatuses corresponding to depths of the input layer;

a fifth operation (e5) of storing input data and a synaptic weight of a corresponding layer in internal buffer memories of the M slave acceleration apparatuses of the input layer;

a sixth operation (e6) of performing, by neural network computation devices of the M slave acceleration apparatuses of the input layer, a neural network computation and storing a result of the computation in an external main memory thereof;

a seventh operation (e7) of transmitting the result of the computation stored in the M slave acceleration apparatuses to the slave acceleration apparatus corresponding to the first depth of the input layer so as to perform a final computation on the corresponding layer, and then transmitting a result of the final computation to the slave acceleration apparatus corresponding to a first depth of a next layer as input data of the corresponding layer;

an eighth operation (e8) of primarily storing, in the external main memory of the slave acceleration apparatus corresponding to the first depth of the next layer, the input data of the corresponding layer and then sequentially storing the corresponding input data in a distributed manner in the external main memories of the M slave acceleration apparatuses of the corresponding layer; and a ninth operation (e9) of repeatedly performing same processes as in the fifth to eighth operations (e5 to e8) until completion of computation on a N-th layer and transmitting a final computation result to the host acceleration apparatus, wherein M and N are natural numbers.

* * * * *